United States Patent [19]
Blachman et al.

[11] Patent Number: 5,131,928
[45] Date of Patent: Jul. 21, 1992

[54] HIGH PRESSURE FACILITATED MEMBRANES FOR SELECTIVE SEPARATION AND PROCESS FOR THE USE THEREOF

[75] Inventors: Marc W. Blackman, Highland Heights; Alex E. Velikoff, Bay Village; James C. Davis, Hudson; Ronald J. Valus, Valley View, all of Ohio

[73] Assignee: The Standard Oil Company, Cleveland, Ohio

[21] Appl. No.: 667,947

[22] Filed: Mar. 11, 1991

Related U.S. Application Data

[63] Continuation-in-part of Ser. No. 506,721, Apr. 9, 1990, Pat. No. 5,057,641.

[51] Int. Cl.$^5$ .............................................. C07C 7/144
[52] U.S. Cl. ........................................ 55/16; 210/638; 210/500.41
[58] Field of Search ..................... 55/16, 158; 210/639, 210/490, 500.25, 500.26, 500.29, 500.30, 500.38, 500.39, 500.41, 638; 585/818

[56] References Cited

U.S. PATENT DOCUMENTS

4,051,300  9/1977  Klein et al. .................... 264/49 X
4,776,936  10/1988  Smith et al. ..................... 55/16 X Primary Examiner—Frank Spear
Attorney, Agent, or Firm—Larry W. Evans; Joseph G. Curatolo; Sue E. Phillips

[57] ABSTRACT

The subject invention relates to a membrane for the selective separation of at least one component of a gaseous feed stream comprising a porous membrane, having pores of from about 10 Angstroms to about 200 Angstroms, the pores containing a facilitator liquid having an affinity for the at least one component to be selectively separated, the membrane being capable of operating at a transmembrane pressure of about 100 psig to about 1000 psig, and the membrane comprising a polymer, a solvent, an alcohol non-solvent, and a viscosity enhancer and pore former.

12 Claims, 7 Drawing Sheets

HIGH PRESSURE FACILITATED MEMBRANES FOR SELECTIVE SEPARATION AND PROCESS FOR THE USE THEREOF

This is a continuation-in-part of U.S. Ser. No. 566,721, now U.S. Pat. No. 5,057,641.

FIELD OF THE INVENTION

The subject invention relates to a membrane (system) for the selective separation of gas stream components. Specifically, the invention relates to the use of facilitated membranes operable at high pressure for the selective removal of light olefins or other components from mixed gas streams wherein the membrane is a polysulfone membrane demonstrating improved performance.

BACKGROUND OF THE INVENTION

There currently exists a number of methods for the selective separation of gaseous feed stream components, including the removal of light olefins from gas streams containing other non-olefinic components. While there has been interest in using membranes as a means of separation, the lack of high flux and high selectivity membranes economically operable in the industrial setting has hindered the application of membranes for this purpose. Ideal characteristics for membranes for separation purposes include the ability of the membrane to maintain its integrity under high pressure and severe environmental conditions; to achieve high performance levels; to maintain high performance levels for an economical period of time; to produce consistent and reliable results; to be easily assembled from commercially available components or to be manufactured with relative ease; and to be technically feasible. The present state of membrane technology offers a number of different membrane systems which attempt to achieve the various characteristics stated above.

Cryogenic distillation is the primary means used commercially to separate feed streams which are gaseous under ambient conditions. This type of process is, however, very costly, both in terms of capital and operating expenses, particularly for components with similar boiling ranges, such as ethylene/ethane, propylene/propane, butylenes/butanes, nitrogen/oxygen and the like.

Facilitated transport membrane technology is a known separation technique. It has been demonstrated in the laboratory for the selective separation of gas stream components, such as the removal of olefins from hydrocarbon-containing feed streams, and $O_2$ from air. The facilitator used normally contains a metal ion with an affinity for the component to be separated. Silver is known to be especially useful for the removal of olefins, iron and cobalt complexes for $O_2$, and organic amines for $CO_2$, to exemplify a few such facilitators. Facilitated transport separations are normally run at relatively low pressure, or with the pressure on either side of the membrane being substantially equalized to avoid pressure differential from pushing the facilitator liquid out of the pores of the membrane support, thus forming a non-selective path of permeation (i.e. a leak). In these cases, a sweep stream is frequently employed to dilute product side component concentrations, and, hence, to increase the partial pressure driving force from the feed side to the permeate side of the membrane.

The most common form of membranes used in facilitated transport separation systems are known as supported or immobilized liquid membranes. The pores of the microporous membrane supports are charged with a solution of complexing ions with an affinity for the component to be separated. The membrane may be an immobilized liquid membrane, such as that disclosed by S. Kimura et al. in *Separation Science and Technology*, Vol. 15 (1980), pg. 1115-1133, wherein a flat porous cellulose membrane charged with potassium carbonate and cesium carbonate was used to selectively separate $CO_2$ from biogas. Examples of this type of membrane typically show short membrane life due to drying of the membrane or migration of the liquid out of the membrane pores.

U.S. Pat. No. 4,750,918 discloses another type of facilitated transport involving the use of hollow fiber membranes, as opposed to flat sheet membranes. In this disclosure, the feed and recovery hollow fibers are immersed in a liquid bath to avoid drying problems often encountered with flat sheet immobilized membranes. The gases permeate through the wall of the feed fiber, diffuse across the liquid bath and permeate into the bore of the recovery fiber. This design, at the expense of permeation rate, offers a potentially longer membrane life than a flat membrane design as cited above, however it also will eventually require regeneration through system shutdown, and is restricted to low transmembrane pressure differentials.

U.S. Pat. Nos. 3,758,603; 3,758,605; 3,770,842; 3,800,506; 3,844,735 and 3,864,418 disclose extensive work in the area of membrane systems used to separate hydrocarbon feeds. These patents recite methods for the separation of aliphatically-unsaturated hydrocarbons and carbon monoxide from feed streams containing these components. The methods disclosed include liquid barrier permeation and metal-complexing techniques. The principle of operation in these techniques involves the use of a metal ion-containing aqueous liquid barrier solution which complexes with the material to be separated. Although similar to those designs cited above, here the complexed material is transferred across the barrier, due to a differential in partial pressure between the feed and product side of the barrier, and is then released on the product side of the membrane for collection. A sweep fluid, usually hexane, nitrogen or helium, is employed for the two fold purpose of: 1) diluting the product stream, thus increasing the partial pressure difference, and 2) equalizing the pressure across the membrane to avoid exceeding the bubble point and blowing the liquid out of the pores of the membrane, or to avoid membrane bursting or collapse.

In "Recent Developments in Separation Science," Vol. 9, 1986, pg. 173, Hughes, Mahoney and Steigelman reported the use of cellulose acetate hollow fiber membranes as liquid membrane supports for silver solutions for the facilitated transport of olefins. These membranes were asymmetric and thin skinned, with a dense, non-porous skin layer, i.e. a reverse osmosis type of membrane, resulting in relatively low permeation rates.

Permeability and stability problems in immobilized liquid membranes were researched by Teramoto et al., *Journal of Membrane Science*, 35 (1989), pg. 115-136, "Separation of Ethylene From Ethane by a Flowing Liquid Membrane Using Silver Nitrate as a Carrier." A separation system is disclosed whereby a module consisting of flowing carrier agent between two microporous membranes is used to separate ethylene from ethane in a feed stream by complexation with the carrier, and then removal by a sweep gas operated at a pressure equal to that of the feed. This is similar to the technique described by Sirkar et al. in U.S. Pat. No. 4,750,918 including the use of two membranes rather than one. A similar design was earlier discussed by Zhang Qi and E. L. Cussler in "Microporous Hollow Fibers For Gas Absorption," *Journal of Membrane Science*, 23 (1985), pg. 321-332.

In both of the foregoing references, a sweep gas was necessary to reduce the partial pressure of the permeate gas on the downstream side of the membrane in order to obtain permeation with low feed partial pressures and to minimize transmembrane pressures.

It is an object of the present invention to provide a membrane separation process which may operate at high pressure differential across the membrane without the need for a product side sweep, thus generating a pure product which does not require further separation.

It is a further object of the invention to provide a membrane system for the continuous separation of at least one component of a gaseous feed stream wherein a single membrane is continuously recharged by the circulation of the facilitator.

SUMMARY OF THE INVENTION

The subject invention relates to a membrane for the selective separation of at least one component of a gaseous feed stream comprising a porous membrane, having pores of from about 10 Angstroms to about 200 Angstroms, the pores containing a faciliator liquid having an affinity for the at least one component to be selectively separated, the membrane being capable of operating at a transmembrane pressure of about 100 psig to about 1000 psig, and the membrane comprising a polymer, a solvent, an alcohol non-solvent, and a viscosity enhancer and pore former.

DETAILED DESCRIPTION OF THE INVENTION

The present invention relates to the selective separation of at least one component of a gaseous feed stream containing the same from the remainder of the feed stream. Exemplary separations include but are not limited to olefin/non-olefin, $CO_2$/methane, $H_2S$ or other acid gases/hydrocarbons, and $O_2/N_2$. The process involves the use of a very small pore membrane, having pores in the size range of about 10 Angstroms to about 200 Angstroms, filled with a complexing agent, or facilitator. The gas phase component to be separated dissolves in the facilitator liquid at the feed gas/membrane interface and can react with the carrier. The carrier-component complex then diffuses via a variety of mechanisms to the product side of the membrane where the reverse reaction takes place and the desired component is collected. The carrier then diffuses back to the feed gas interface where it can react with another gas phase component molecule.

In order to avoid stability problems caused by membrane drying, the following techniques may be employed. For liquid recycle, the facilitator or complexing agent solution may be continuously pumped on the permeate side of the hollow fiber membrane. Alternatively, the solution may be pumped intermittently as two phase flow. Thus, once the complexed gas of choice (permeate) has permeated the membrane, it is fed to a flash drum where the collected gas is released and any collected facilitator is then returned to the flow of uncomplexed facilitator being pumped through the membrane system. Alternatively, for vapor recycle, a portion of the permeate may be saturated with water and recycled through the permeate side of the hollow fiber to keep the membrane wet. These techniques avoid the problem of membrane drying or loss of facilitator. This process may be used for the production of a relatively pure product stream, or may be used as a means to increase the concentration in a given feedstock by treating a portion of the feed and combining the pure product with the remainder of the feed.

The average pore size on the surface of the membrane support determines the force necessary to hold the carrier-containing solvent within the pore structure. The smaller the pore the higher the pressure necessary to dislodge the liquid from the pore. The use of a very small pore membrane therefore enables the separation system to operate under unusually high transmembrane pressure, thereby enhancing the flux. The permeability coefficient per unit thickness ($Q/1$) of typical systems, such as ion exchange membrane separation systems, decreases with an increase in the pressure of the feed gas, resulting in minimal flux increase with feed partial pressure increase. The subject systems, however, demonstrate enhanced stability of $Q/1$ values even when the pressure of the feed gas is increased, thus resulting in the enhanced flux rate of the systems, a result of increased feed partial pressure.

When conducting a gas phase separation, the process of the subject invention is run at a partial pressure differential as well as a high total pressure differential across the membrane. By the term "total pressure differential" is meant that there is a significant difference between the high pressure on the feed side of the membrane and the much lower pressure on the product side of the membrane. Typical operating pressures are in the range of about 115-315 psia on the feed side and about 15-115 psia on the product side, but feed pressures may be much higher with a corresponding increase in permeate pressure. The product side pressure is typically about 5% to about 35% of that on the feed side but may vary beyond those limits. Therefore, there is a high total pressure differential across the membrane. The ability of the small pore membrane used to withstand this high pressure allows the system to operate without the need for a sweep diluent to reduce the partial pressure of the permeate on the product side of the membrane. Further, because the product is not mixed with a sweep the need for the further separation of the product from the sweep is negated.

For the liquid facilitator recycle system, the flux rate of the system can be varied by varying the facilitator flow rate. In general, the higher the facilitator flow rate, the higher the flux obtained, until the permeation rate becomes membrane diffusion limited. Another way to alter the flux rate is to vary the temperature at which the complexed gas is stripped from the facilitator in the flash drum. If the absorption process is exothermic in nature, increasing the temperature in the flash drum will more completely strip the absorbed gas from the facilitator, thus leaving a facilitator with greater capacity for further absorption to be recirculated to the membrane for further separation.

The membrane of choice should have a molecular weight cut off (MWCO) of from 500 (10 Angstroms) to about 100,000 (200 Angstroms), preferably from about 2,000 to about 30,000. These membranes have pore size ratings similar to typical ultrafiltration membranes. Membranes useful for the process disclosed herein will be those membranes which are strong enough to withstand high operating pressures, i.e. will function efficiently at transmembrane pressures of 100 psig and above, up to about 1000 psig, without bursting or collapsing, and without having the facilitator solution forced out of the membrane pores.

Note, however, that it may be possible, and under certain conditions desirable, to operate the liquid recycle at near equal pressures on the feed and liquid recycle sides of the membrane, and further to use a larger pore membrane.

Composition of the membrane is not a critical factor herein as the membrane acts as an inert support for the solvent containing the metal ion carrier species. The membrane should be inert to the potentially harsh solvating power of the carrier species (which is often of a high salt concentration), may be isotropic or anisotropic, and may further be hydrophobic or hydrophillic. Suggested membrane materials include polysulfone, cellulose acetate, regenerated cellulose, polyimide, polycarbonate, polyamide, and fine pore ceramic, metal or glass, among others. Also, in limited applications ion exchange membranes may be used, however increased transmembrane pressure may adversely affect the performance of this type of membrane.

The membranes suggested for use herein may be skinned (anisotropic) membranes. For such membranes, the skin is usually about 500 Angstroms to about 10 microns thick. This thin layer is the initial separating layer and is responsible for the pressure integrity of the membrane. It has a characteristic pore size, which determines the amount of pressure under which the membrane will remain efficiently functional.

In specific gas separation applications such as olefin-paraffin upgrading, refinery off-gas separations, gas purification, and other such separations which will be readily recognized by those skilled in the art, it may be desirable to use a polysulfone polymer membrane formulation, which includes a non-solvent, such as iso-propyl alcohol, prepared in the hollow fiber form. Polysulfone hollow fibers have shown great utility as assymetric membranes for facilitated transport separations, demonstrating good permeation rates and excellent mechanical strength. Further, the formulation includes a pore former and an appropriate solvent. The purpose of the added non-solvent is to improve the resulting fiber's performance, in terms of permeability, while maintaining mechanical integrity and providing long-term stability of the fiber spinning solution.

Fiber spinning solutions not containing the alcohol non-solvent suggested above typically consist of the polymer, a viscosity enhancer and pore former, and a compatible solvent, exemplary of which would be a mixture of polysulfone, polyvinylpyrrolidone and an amide such as dimethylacetamide or N-methylpyrrolidone. Fibers prepared from this type of solution may demonstrate good performance, however the spin solution has poor stability and becomes cloudy as a result of gradual polysulfone precipitation. This problem then necessitates a difficult filtration step as part of the fiber spinning process.

A hollow fiber is formed by pumping the polymer solution through an appropriate spin head, followed by an aqueous quench. The quench quickly leaches the amide solvent from the polymer, resulting in rapid precipitation of the hydrophobic polysulfone and solid fiber formation.

The spinning of a quality fiber depends upon several factors: the fiber material (in this case polysulfone) must be incompatible with the quench solution, providing a fiber with a high degree of mechanical integrity. The fiber material must also have borderline solubility in the dope solvent. This ensures that polymer precipitation will be rapid. This also is a key factor in determining the morphology of the resultant fiber. Finally the dope solvent must be miscible with the quench solution. Rapid extraction of the dope solvent into the quench solution is also a key factor in obtaining a strong fiber of appropriate morphology.

The balancing of the above factors, along with the careful selection of the other components present in the spinning dope, is essential in order to obtain a fiber that is strong, asymmetric and demonstrates good performance.

One skilled in the art will know that depending on the specific polymer/solvent combination selected, precipitation of the polymer may be controlled. This, however, often results in loss of performance in the resulting fiber. For example, while a combination of UDEL/polysulfone polymer and dimethylacetamide (DMAC) solvent displays considerable precipitation of the polysulfone in the spinning solution, a combination of the same polysulfone polymer with N-methyl-2-pyrrolidone (NMP) does not cause precipitation at this stage. However, the fiber spun from the latter combination displays poorer performance characteristics in terms of permeability.

Theoretically, the greater solubility of UDEL ® in NMP results in a less rapid precipitation of the polymer during the quenching step, thus forming a more dense fiber which demonstrates decreased permeability. The addition of a non-solvent to this type of polymer/solvent combination is known to modify the solvent properties as is suggested by Israel Cabasso, et al., "Research and Development of NS-1 and Related Polysulfone Hollow Fibers for Reverse Osmosis Desalination of Seawater," Gulf South Research Institute, July 1975, and by Klein, et al., "The Use of Solubility Parameters for Solvent Selection in Asymmetric Membrane Formation," pg. 61–84, *Reverse Osmosis Membrane Research*, 1972. By selecting the proper non-solvent, one is able to make one solvent behave more like another solvent, i.e. NMP more like DMAC without achieving full DMAC behavior. In the specific instance of adding iso-propyl alcohol non-solvent to a combination of UDEL ® polysulfone and NMP, however, the resulting fiber unexpectedly out-performs the fiber produced using UDEL ® and DMAC with the added advantage of being a more stable spinning solution. This alcohol-containing spin formulation greatly enhances the fiber performance in the high pressure facilitated transport application disclosed herein, due to a significant increase in permeability of the fiber to ethylene.

While this discussion of formulation has been set forth in terms of spinning hollow fibers, the same principles of formulation are equally applicable to the preparation of other forms of membranes, such as flat sheet or tubular. The membrane as prepared above is used for facilitated transport by charging the membrane with the carrier species by dissolving the carrier in an appropriate solvent, aqueous or otherwise, and then saturating the membrane with the carrier-containing liquid. This results in the pores of the membrane being loaded with the carrier-containing solvent. The pores are where the actual separation of the permeate from the feed occurs.

The carrier species must be an agent which will reversibly complex with the desired component in the feed stream. Usually a metal complex is employed. However, other materials with favorable coupling-/decoupling kinetics and acceptable solubilities in the liquid media may also be used.

The process of the present invention is operable at a wide range of temperatures, as long as the temperature does not exceed the boiling point of the facilitator liquid at the operating pressure or the melting point of the membrane support, or fall below the freezing point of the facilitator liquid.

DETAILED DESCRIPTION OF THE DRAWINGS

While the separation of many gaseous feed streams can be accomplished using the subject process, one separation for which the process is particularly well-suited is the separation of light olefins from feed streams containing the same.

Figure 1A:
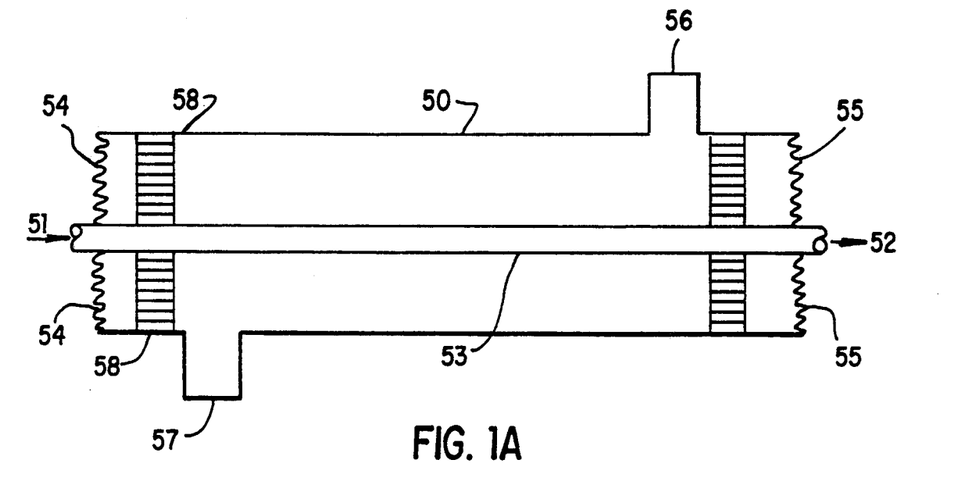
FIG. 1A is a schematic of the membrane system with liquid facilitator recycle.

FIG. 1A schematically depicts a membrane system with liquid facilitator recycle. The membrane separation unit 50 contains hollow fiber membrane 53. The facilitator is continuously pumped through hollow fiber membrane 53, entering at facilitator inlet 51 and exiting at loaded facilitator outlet 52 after having complexed with the component to be separated from the feed stream, which enters unit 50 at gas feed inlet 56 and exits unit 50 at gas reject outlet 57. Unit 50 has tube sheet (potting) 58 at either end, and facilitator feed header 54 at facilitator inlet 51 and facilitator effluent header 55 at loaded facilitator outlet 52.

Figure 1B:
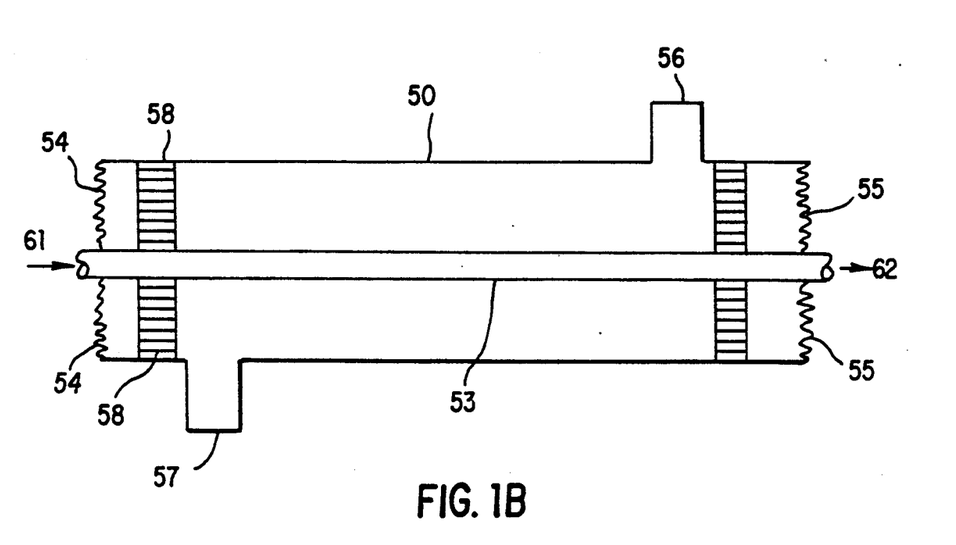
FIG. 1B is a schematic of the membrane system with water saturated permeate vapor recycle.

FIG. 1B represents a similar membrane separation unit 50 with water saturated permeate vapor recycle. In this instance, membrane separation unit 50 contains hollow fiber membrane 53 which is fed by water saturated permeate vapor at inlet 61, which exits unit 50 at water saturated permeate vapor outlet 62 after complexing with the desired feed component.

Figure 2:
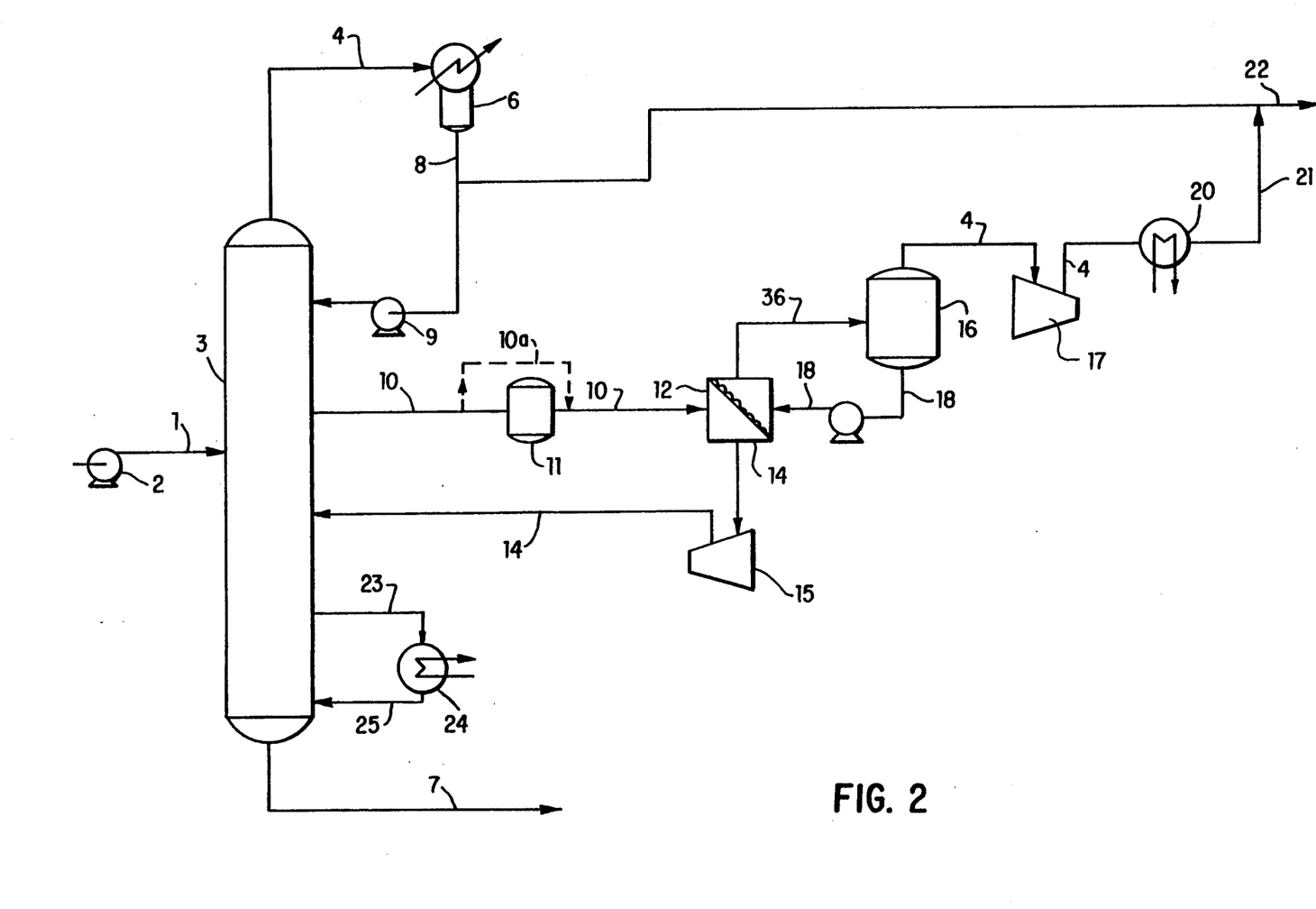
FIG. 2 is a schematic diagram of a propane/propylene hybrid distillation/membrane separation system.

Referring now to FIG. 2, there is depicted a system for carrying out a propylene/propane separation membrane process. In this process, a feed stream 1 is pumped by feed pump 2 into a propylene/propane splitter column 3. Column 3 partially separates the feed stream such that propylene rich vapor 4 is drawn from the top of column 3, a combination propylene and propane vapor 10 is drawn off the side of column 3, and propane liquid 7 is drawn off the bottom of column 3. Propylene rich vapor 4 drawn off the top of the column 3 is channeled through condenser 6, where the propylene rich vapor is cooled by a flow of cold water through condenser 6. A portion of the propylene liquid overheads 8 produced by this condensation is channeled to produce product 22, while the remainder of overheads 8 are refluxed through reflux pump 9 and re-enter column 3 for further purification.

Propylene and propane vapor 10 drawn off the side of column 3 will be separated to produce propylene liquid 21, which is combined with propylene liquid overheads 8 to produce liquid propylene product 22, and propylene-lean propylene/propane vapor mixture 14 which is returned to column 3. To achieve this separation, propylene-rich propylene/propane vapor 10 may be first saturated in saturation drum 11, producing wet propylene-rich propylene/propane vapor 10. Optionally, propylene-lean propylene/propane vapor 10 may be fed directly to membrane system 12 without being first saturated (10a). Vapor 10 is then channeled through membrane system 12, as described previously herein, to separate propylene 36 from propylene-lean propylene/propane vapor mixture 14 using a facilitator. Propylene 36 flows through flash drum 16 where the propylene is collected from the $AgNO_3$ facilitator. Uncomplexed propylene vapor 4 is then drawn off flash drum 16, compressed in propylene compressor 17, condensed in propylene condenser 20 by a flow of cold water, and the resulting propylene liquid 21 is combined with propylene rich liquid overheads 8 to produce an at least 95% pure liquid propylene product 22.

$AgNO_3$ facilitator 18 from which the propylene was collected in flash drum 16 is returned to membrane system 12.

Propylene-lean propylene/propane vapor mixture 14, or retentate from the membrane separation of propylene-rich propylene/propane vapor 10, is compressed in retentate compressor 15 and re-enters column 3.

Propane liquid is drawn off the lower part of column 3 as propane bottoms 7 and as reboiler feed 23 which is channeled through propane reboiler 24 wherein it is vaporized by the addition of heat to produce propane vapor 25 which can re-enter column 3.

Figure 2A:
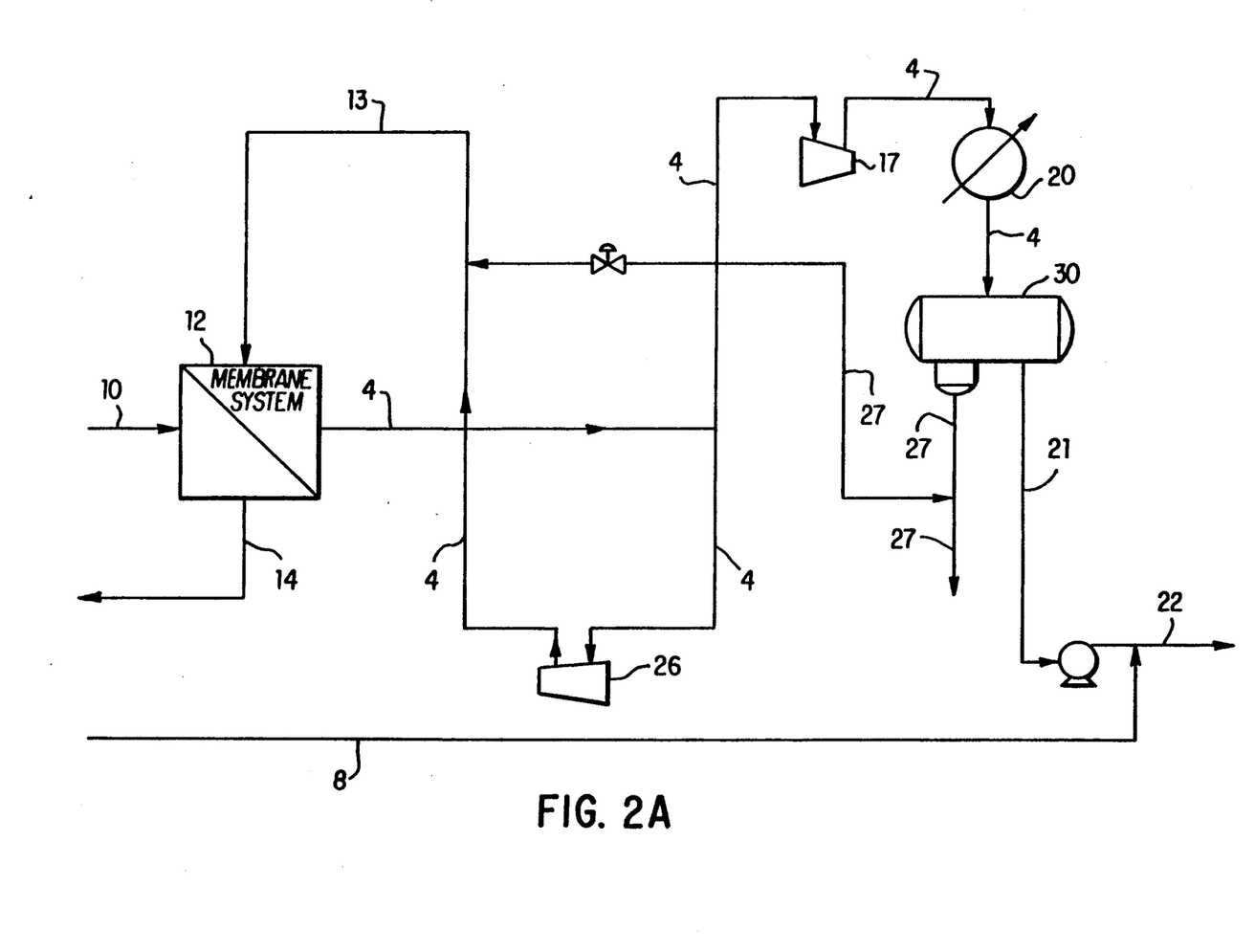
FIG. 2A is a schematic diagram of the membrane system of FIG. 1 with vapor phase permeate.
Figure 2B:
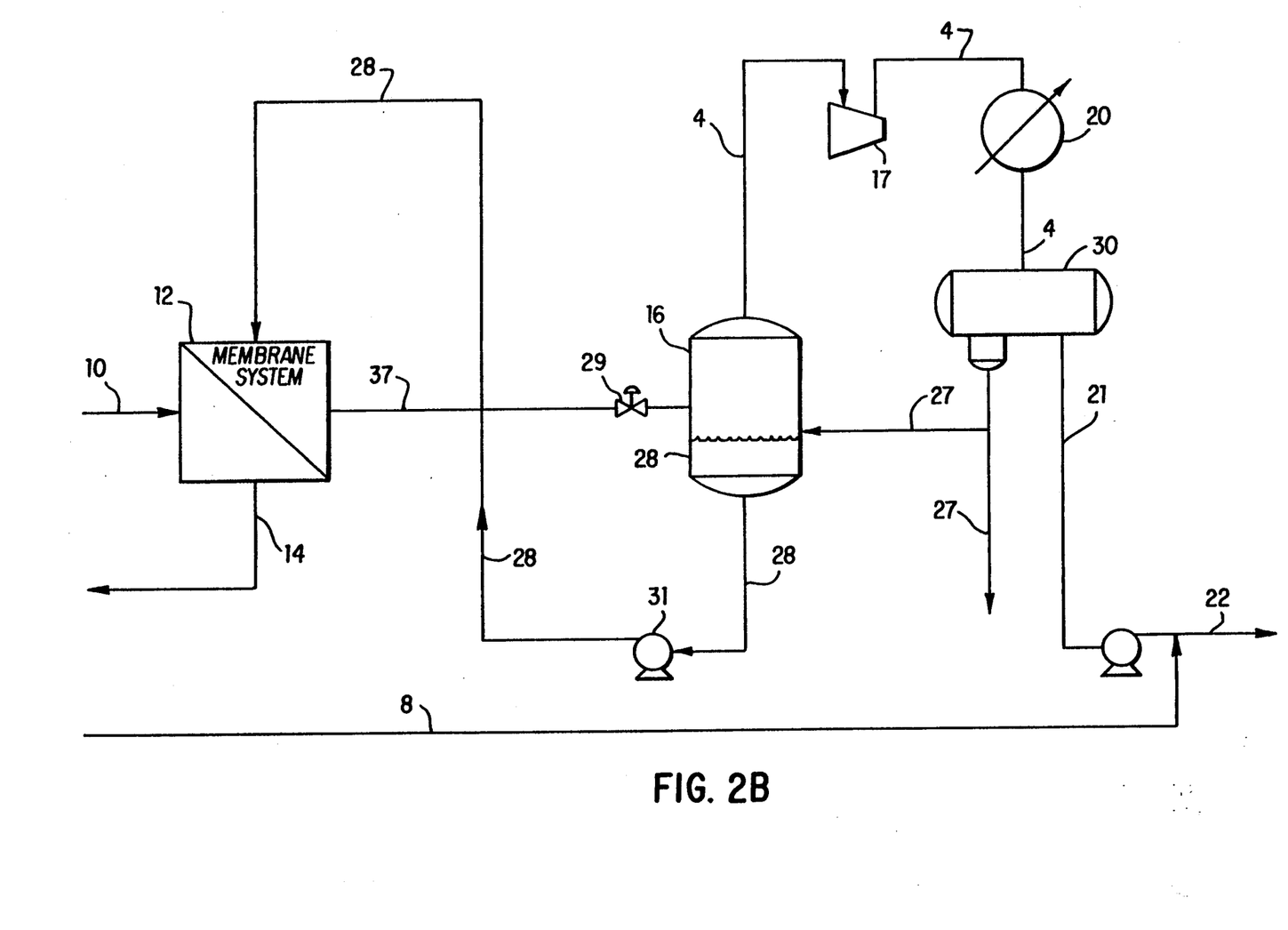
FIG. 2B is a schematic diagram of the membrane system of FIG. 1 with liquid silver nitrate recirculation (pressure cycle).
Figure 2C:
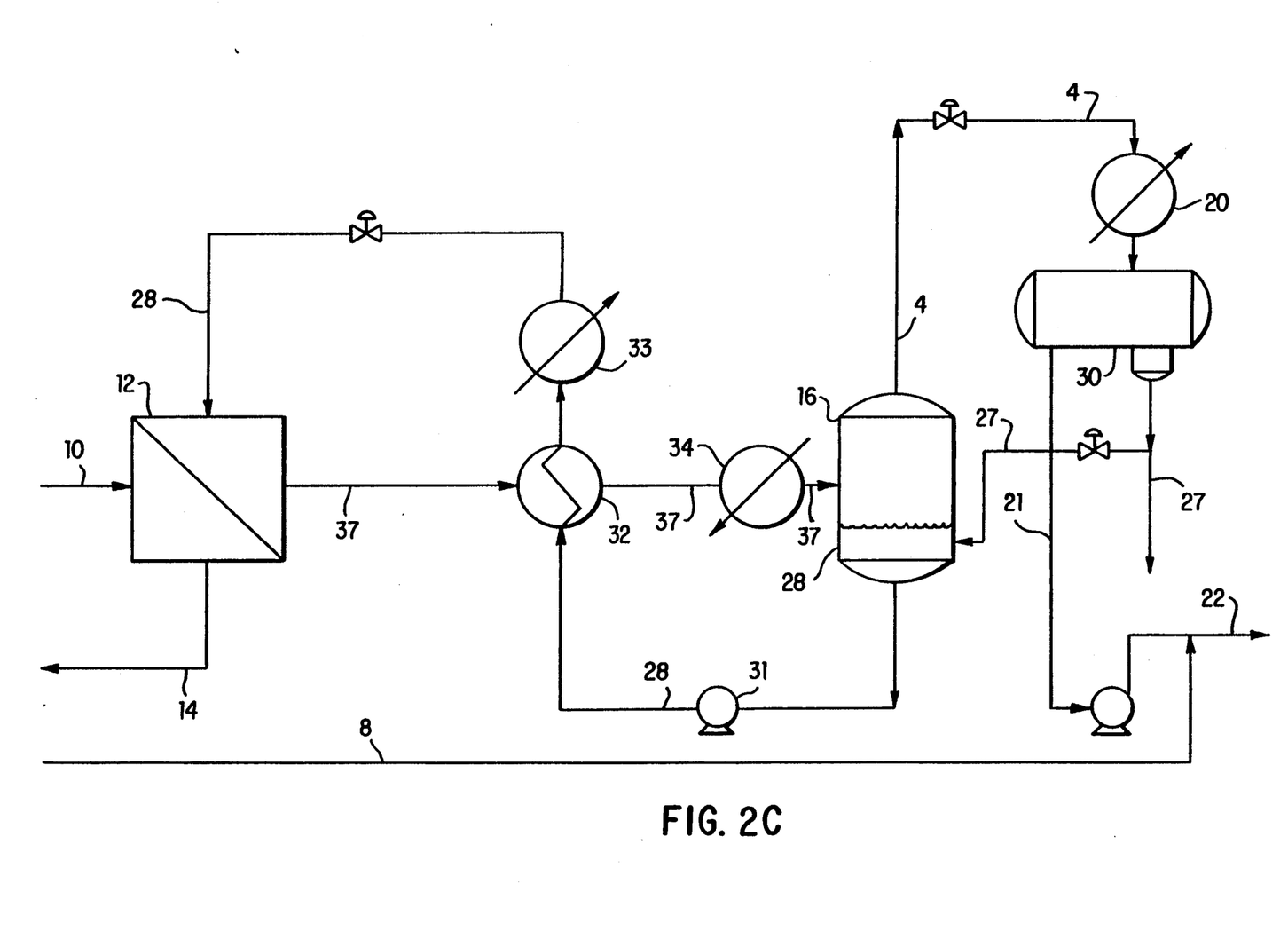
FIG. 2C is a schematic diagram of the membrane system of FIG. 1 with liquid silver nitrate recirculation and thermal stripping (thermal cycle).

FIGS. 2A, 2B and 2C depict various types of membrane separation systems applicable to the overall separation process of FIG. 2.

In FIG. 2A, the membrane system of FIG. 2 is a vapor phase permeate system. In this type of system, the propylene product is drawn off membrane system 12 as propylene vapor 4. A portion of propylene vapor 4 is recycled to membrane system 12 via recycle compressor 26. It is recombined with water 27 using a control valve to produce water saturated stream 13. The remainder of propylene vapor 4 is compressed in propylene compressor 17, condensed in condenser 20 and collected in water separator 30. After condensation, water 27 is removed from the propylene liquid product 21.

In FIG. 2B, $AgNO_3$ facilitator liquid is added to flash drum 16 and facilitator 28 is continuously circulated through membrane system 12. Complexed propylene and $AgNO_3$ facilitator 37 is drawn off membrane system 12 and channeled to flash drum 16. The liquid 37 from membrane 12, which is operated at a higher pressure of 15 psig up to slightly less than the working feed pressure, is let down across pressure regulator 29 to flash drum 16 which is operated at a lower pressure, causing propylene 4 to be released from the facilitator. Uncomplexed $AgNO_3$ liquid 28 is circulated continuously, through facilitator pump 31, from flash drum 16 back to membrane system 12. Water 27 from water separator 30 is fed into flash drum 16 to maintain a constant facilitator concentration.

In FIG. 2C, the membrane system is operated at a constant pressure on the permeate side of the system, however membrane system 12 is kept at a lower temperature, 25°–50° C., than flash drum 16, at 60°–120° C., thus allowing the $AgNO_3$ facilitator to complex with the propylene in membrane system 12, and then flashing off the propylene in the higher temperature flash drum 16. This is accomplished by running $AgNO_3$/propylene complex 37 through heat exchanger 32 and heater 34 before it enters flash drum 16. In flash drum 16, propylene vapor 4 is separated from $AgNO_3$ facilitator 28. A control valve in propylene vapor line 4 regulates the pressure of the facilitator liquid in the membrane. Flash drum 16 contains uncomplexed $AgNO_3$ facilitator liquid 28 which feeds pump 31 to continuously circulate $AgNO_3$ facilitator 28 back to membrane system 12. Because $AgNO_3$ facilitator 28 is still at a high temperature when leaving flash drum 16, it is sent through heat exchanger 32 and then through cooler 33. A control valve is used to regulate the return of $AgNO_3$ facilitator 28 to membrane system 12.

Figure 3:
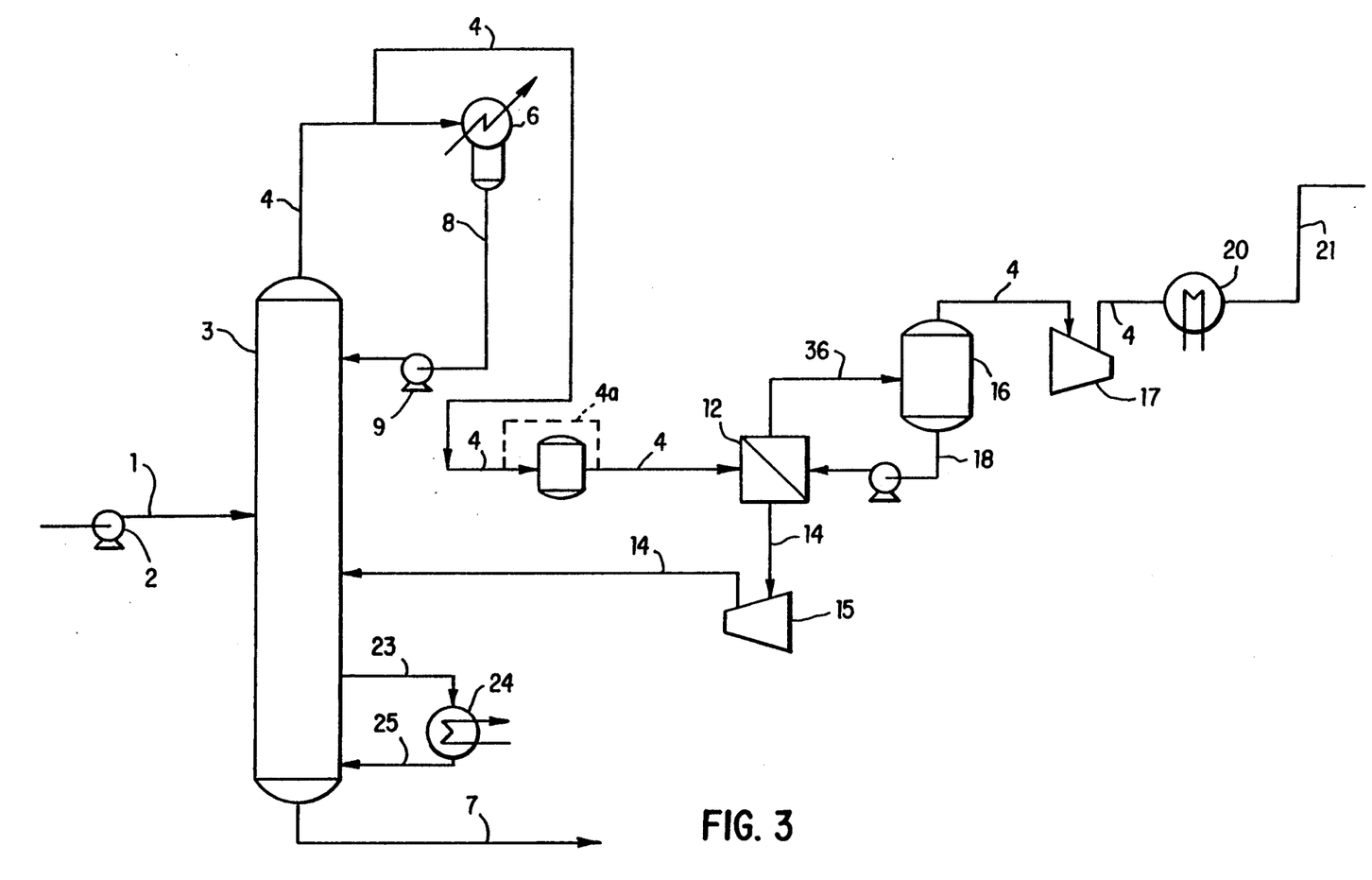
FIG. 3 is a schematic diagram of a high purity propylene propane/propylene hybrid distillation/membrane separation system.

FIG. 3 is a schematic diagram of a general propane/propylene separation membrane process operable to produce a liquid propylene product of approximately 99.5% purity. This is accomplished by channeling a portion, about 4–15%, of propylene rich vapor 4, drawn off the top of column 3, through membrane system 12, and not taking a side-draw of propylene-rich propylene/propane vapor 10 as is shown in FIG. 2. The separation unit as a whole is moved to the top of column 3 to accomplish production of a 99.5% pure liquid propylene product 21.

With this system set-up, the specific types of separations shown in FIGS. 2A, 2B and 2C can be used similarly as with the FIG. 2 set-up.

Figure 4:
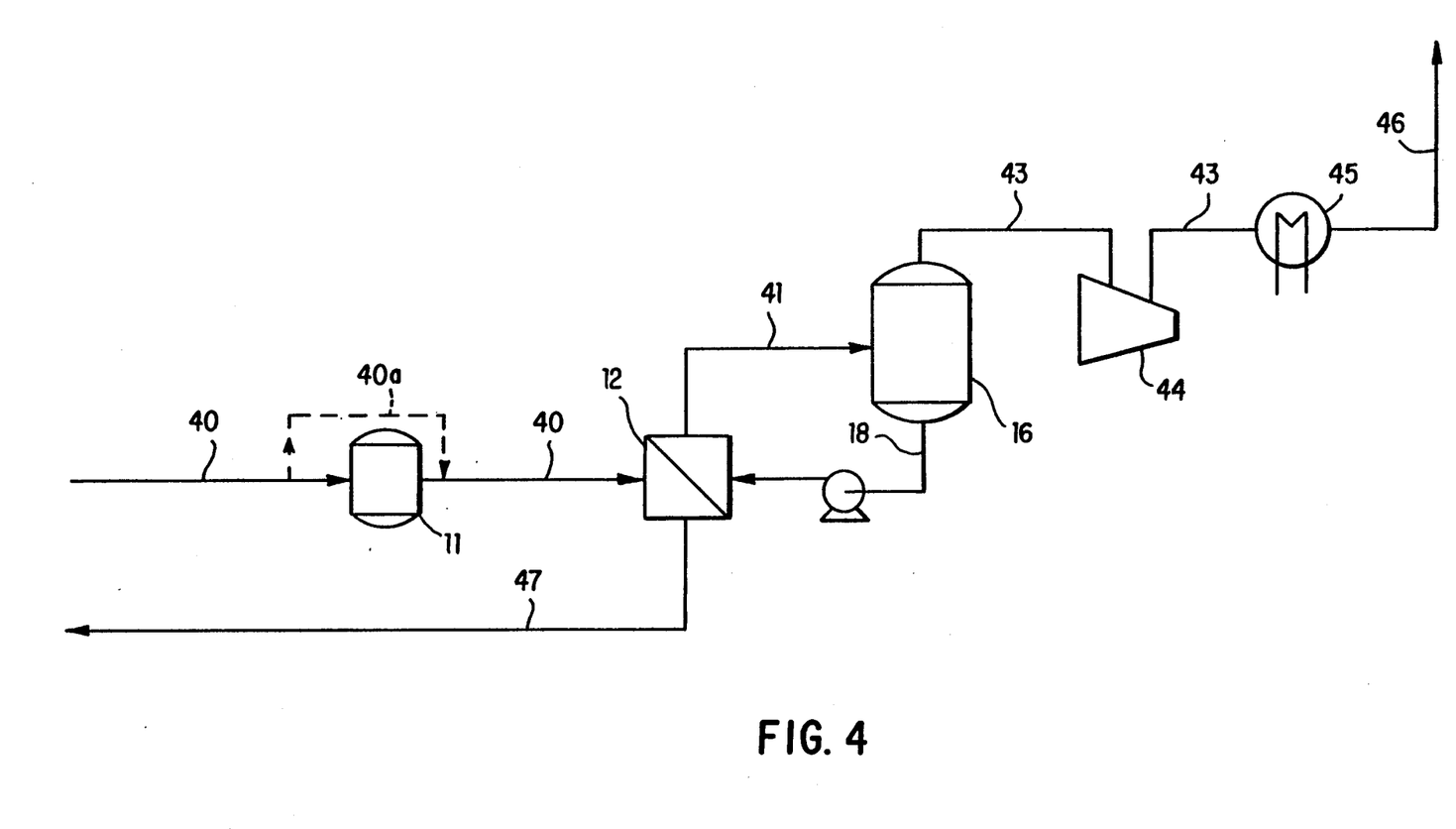
FIG. 4 is a schematic diagram of a membrane process for the recovery of olefins from waste gases.

In FIG. 4, a membrane process is shown for the recovery of olefins from olefin-containing waste gas. Waste gas 40 is sent through saturation drum 11 to produce wet waste gas 40, if necessary, which then enters membrane system 12. Alternately, waste gas 40 can be taken directly, via route 40a, to membrane system 12. The membrane used can be any suitable membrane with a facilitator, as disclosed above. The membrane separates the waste gas to produce non-olefins 47, which can then be flared or used for fuel, and complexed olefins 41. Complexed olefins 41 enter flash drum 16 where the complex releases the olefin, and any $AgNO_3$ facilitator is collected and recycled as stream 18, and olefin vapor 43 is channeled through compressor 44 and cooler 45 to produce olefin product 46.

As above with FIG. 3, the variations to the membrane system shown in FIGS. 2A, 2B and 2C are equally applicable to this olefin process.

EXAMPLES

The following experimentation was conducted to demonstrate the good flux rate and purity of product that the subject membrane system can achieve operating at high pressure.

EXAMPLE 1

The separation of ethylene from a feed stream containing ethylene, ethane and helium can be effected according to the process set forth below. Isomorphous cellulosic fibers were removed from a CD Medical cartridge and fashioned into a hollow fiber module of 90 fibers, each 5.75 inches long. The fibers were loaded by pumping 2M silver nitrate solution through them for $\frac{1}{2}$ hour and then thoroughly draining any excess solution from the module. Since the pressure was applied from the inside/out, the inner diameter of the membrane, 212 microns, was used to calculate the total membrane area of 87.55 $cm^2$. The test gas for the experiment contained 13.79% ethylene and 14.04% ethane, with the balance being helium. The gas was fed directly from the gas cylinder through a regulator to determine the pressure of the feed. The gas was saturated with water using a high pressure water saturator at room temperature, and then passed through the fibers of the room temperature module. Back pressure was created and controlled on the outlet side of the module by means of a regulating valve. The permeate gas passed through the fibers, into the shell of the module, and finally to the sample loop of a gas chromatograph for analysis. The total pressure of the feed was 125 psig. The rate of gas permeating through the fibers was 5.43 ml/min., while the gas reject rate (the flow of gas not permeating the fibers) was 141 ml/min. The Q/l, the permeability coefficient per unit thickness value, for ethylene and ethane were 2.68e-5cc(STP)/$cm^2$-sec-cm Hg and 1.82e-7cc(STP)/$cm^2$-sec-cm Hg respectively, accounting for a separation factor for ethylene/ethane of 147. This corresponds to an olefin flux of 2.5 SCFD/$ft^2$ (standard cubic feet of gas per square foot of membrane area) and a helium-free olefin purity of 98.0%.

EXAMPLE 2

In this Example, the same module as described above in Example 1 was run under identical conditions at 160 psig. In this instance, the Q/l values were $2.68e^{-5}$ cc(STP)/$cm^2$-sec-cm Hg for ethylene and $2.03e^{-7}$ cc(STP)/$cm^2$-sec-cm Hg for ethane, with a separation factor of 132. This corresponds to an olefin flux of 4.2 SCFD/$Ft^2$ and a helium-free olefin purity of 98.3%. This demonstrates that operating at higher pressure (160 psig versus 125 psig) gave a 68% increase in flux (4.2 versus 2.5), without loss of product purity (98.3 versus 98.0).

EXAMPLE 3

A membrane module was made using anisotropic polysulfone ultrafiltration hollow fibers. The total fiber surface area was 75.6 $cm^2$. The feed gas contained 78% propylene and 22% propane. This was introduced into the module at 205 psig and 45° C. A solution of silver nitrate (5M) was continuously pumped through the permeate side of the membrane at about 7 cc/min. and 100 psig. The flash drum temperature was 70° C. This system was monitored under these conditions continuously over a 30 day period. Over this time period, the system maintained an olefin flux of 12SCFD/$ft^2$ and purity of 99.6%.

EXAMPLE 4

A membrane module was made using anisotropic polysulfone ultrafiltration hollow fibers. The total fiber surface area was 67.3 $cm^2$. The feed gas contained 70% ethylene and 30% nitrogen. This was introduced into the module at 150 psig and 20° C. A 3M solution of silver nitrate was continually pumped through the permeate side of the membrane at about 11 cc/min. The temperature of the flash drum was varied between 90° C. and room temperature.

This system was monitored over a period of 16 days. With this system, the permeate gas was recovered at 50 psig.

| Flash Drum Temperature °C. | Ethylene Flux (SCFD/ft$^2$) | Olefin Purity |
|---|---|---|
| 90 | 23.0 | 99.9 |
| 70 | 22.0 | 99.8 |
| 50 | 14.9 | 99.8 |
| 30 | 8.9 | 99.7 |

This data indicates that increase in the flash drum temperature, i.e. thermal swing span, effects the system in a predicable manner, such that a increase in flux was seen with the increase in the temperature differential between the membrane and the flash drum. The purity of the recovered olefin was not affected. This data also demonstrates that above approximately 70° C. the olefin flux is stable, at around 22SCFD/ft$^2$, regardless of further temperature increase.

EXAMPLE 5

A membrane module was made using cellulosic isomorphous fibers. The total fiber surface area was 23.6 cm$^2$. The feed gas contained 70% ethylene and 30% ethane. This was introduced into the module at 175 psig and 25° C. A 2M solution of silver nitrate was continually pumped through the permeate side of the membrane. The liquid in the membrane module was at 90 psig, and the pressure in the flash drum was 5.7 psig.

The system demonstrated an olefin flux of 26SCFD/ft$^2$ and an olefin purity of 99.4%.

This demonstrates a membrane system using a different type of fiber operating at high pressure to achieve good flux and purity.

In the following Examples, the membrane module was made from polysulfone fibers that were spun from a spin formulation containing isopropyl alcohol, N-methyl-2-pyrrolidone, polysulfone and polyvinylpyrrolidone. The use of iso-propyl alcohol in the formulation enhances the fibers performance, while maintaining mechanical integrity and spin solution stability. The iso-propyl alcohol is miscible with the N-methyl-2-pyrrolidone and water, and is a solvent for polyvinylpyrrolidone and a non-solvent for polysulfone.

The iso-propyl alcohol may be added to the spin formulation until the polysulfone is no longer soluble therein, i.e. the solution begins to cloud as polysulfone precipitates out of solution. As a percent total of solvent, that is N-methyl-2-pyrrolidone plus iso-propyl alcohol, this normally ranges from 0% to 40%, preferably from 5% to 20%. Lower percentages of iso-propyl alcohol added result in greater solution stability.

A typical hollow fiber production run is carried out as follows: In a mixer is placed 3775 g N-methyl-2-pyrrolidone, 413 g iso-propyl alcohol, 1142 g GAF K-30 polyvinylpyrrolidone and 2284 g UDEL ® P1835 polysulfone. The resulting slurry is mixed at 100° C. until a clear solution is formed. After cooling and de-gassing the solution is pumped at 4.5 cc/min through a filter and into a spinneret. The solution is extruded through the annular region of the spinneret orifice into a 20° C. water quench bath through an air gap of 1.0 cm. Nitrogen is delivered to the needle in the center of the spinneret orifice to support the fiber lumen. The fiber is pulled across a guide at the bottom of the quench bath using a speed-controlled godet and collected on a winder.

The resulting fiber has an asymmetric structure with a distinct dense, porous skin on the outside surface and a spongy, macrovoid-free substructure.

Hollow fiber performance was evaluated by fabricating the fibers into modules and connecting them to a liquid recycle silver-facilitated olefin purification system.

Fiber performance is evaluated by passing a test gas over one side of the fiber while circulating the facilitator solution (in this case aqueous AgNO$_3$) over the other side. The facilitator selectively transports olefin through the membrane wall, leaving non-olefins behind. This accounts for the high selectivities obtained. The circulating AgNO$_3$ then goes to a knock-out pot where the solution de-gasses, creating the permeate stream. Analysis of the permeate provides the data on olefin permeation rate and selectivity (separation factor).

EXAMPLE 6

Hollow fiber modules were prepared from fibers made from three separate formulations by drawing the necessary number of fibers to yield the desired surface area through the appropriate stainless steel casing and fittings. The ends of the module were potted with epoxy and allowed to set for one day. The module was flushed with 1.0 liter of distilled water and the excess water was blown out of the module with helium. The module was then ready to be connected to the testing system.

In a standard test an ethylene/ethane (75/25) gas mixture was passed over one side of the membrane at a flow rate of 50.0 cc/min. under a pressure of 125 psig at 25° C. A 5.0N AgNO$_3$ solution was circulated through the inner bore of the fiber at a rate of 8.0–16.0 cc/min under a backpressure of 25 psig. Ethylene flux and ethylene/ethane separation factor were determined by analysis of the permeate flow de-gassing from the AgNO$_3$ solution at the knock-out pot. The fiber spinning formulations and their performance are shown in Table I.

The above performance data shows that all fibers afford excellent ethylene/ethane separation. However, when the ethylene Q values (ethylene flux normalized to both driving force and fiber wall thickness) are compared, the fiber prepared from the NMP/IPA solution proved superior. It's ethylene Q was 1.7 times that of the DMAC fiber and 2.3 times that of the NMP fiber.

EXAMPLE 7

Modules were prepared as in Example 6. In a standard test an ethylene/nitrogen (70/30) gas mixture was passed over one side of the membrane at a flow rate of 100.0 cc/min under a pressure of 125 psig at 20° C. A 3.0N AgNO$_3$ solution was circulated through the inner bore of the fiber at a rate of 22.0 cc/min under a liquid back-pressure of 25 psig and a permeate gas back-pressure of 5.0 psig. Ethylene flux and ethylene/nitrogen separation factor were determined by analysis of the permeate flow de-gassing from the AgNO$_3$ solution at the knock-out pot. The fiber spinning formulations and their performance are shown in Table II.

The above performance data shows that the IPA fiber afforded a better ethylene/nitrogen separation than did the NMP fiber (354 vs. 282). The ethylene Q value was also superior, being 1.8 times greater than the NMP fiber.

The foregoing examples have been presented to demonstrate the operation of the subject membrane system as set forth herein at high pressure. These examples are not intended to limit the subject invention, the breadth of which is defined by the specification and the claims appended hereto, but are presented rather to aid those skilled in the art in clearly understanding the invention defined herein.

TABLE I

| Fiber # | % PS | % PVP | % Solvent | Fiber Dimensions [OD/ID (Wall) in μm] | Spinning Formulation Ethylene Q/l (cc/cm2 sec cmHg) | Ethylene Q (cc cm/cm2 sec cmHg) | Ethane Q/l (cc/cm2 sec cmHg) | Separation Factor |
|---|---|---|---|---|---|---|---|---|
| 1 | 30 | 15 | 55 (100% DMAC) | 415/206 (104.5) | $8.55 \times 10^{-6}$ | $8.93 \times 10^{-8}$ | $3.52 \times 10^{-8}$ | 243 |
| 2 | 30 | 15 | 55 (100% NMP) | 309/189 (60) | $1.14 \times 10^{-5}$ | $6.84 \times 10^{-8}$ | $2.75 \times 10^{-8}$ | 418 |
| 3 | 30 | 15 | 55 (9/1 NMP/IPA) | 430/252 (89) | $1.81 \times 10^{-5}$ | $1.61 \times 10^{-7}$ | $5.06 \times 10^{-8}$ | 358 |

TABLE II

| Fiber # | % PS | % PVP | % Solvent | Fiber Dimensions [OD/ID (Wall) in μm] | Spinning Formulation / Fiber Performance Ethylene Q/l (cc/cm2 sec cmHg) | Ethylene Q (cc cm/cm2 sec cmHg) | Ethane Q/l (cc/cm2 sec cmHg) | Separation Factor |
|---|---|---|---|---|---|---|---|---|
| 4 | 30 | 15 | 55 (100% NMP) | 350/210 (70) | $9.38 \times 10^{-6}$ | $6.57 \times 10^{-8}$ | $3.34 \times 10^{-8}$ | 282 |
| 5 | 30 | 15 | 55 (9/1 NMP/IPA) | 418/247 (85.5) | $1.42 \times 10^{-5}$ | $1.21 \times 10^{-7}$ | $4.00 \times 10^{-8}$ | 354 |

What we claim is:

1. A membrane for the selective separation of at least one component of a gaseous feed stream comprising a porous membrane, having pores of from about 10 Angstroms to about 200 Angstroms, said pores containing a facilitator liquid comprising a carrier dissolved in a suitable solvent and functioning as a means for increasing the flux of said at least one component and having an affinity for said at least one component to be selectively separated, said membrane being capable of operating at a transmembrane pressure of about 100 psig to about 1000 psig.

2. The membrane of claim 1 wherein said membrane has a molecular weight cut off of from about 500 to about 100,000.

3. The membrane of claim 1 wherein said membrane has a molecular weight cut off of from about 2,000 to about 30,000.

4. The membrane of claim 1 wherein said membrane is selected from the group consisting of polysulfone, cellulose acetate, regenerated cellulose, polyimide, polycarbonate, polyamide, fine pore ceramic, glass and metal.

5. The membrane of claim 1 wherein said membrane is anisotropic.

6. A membrane for the selective separation of at least one component of a gaseous feed stream comprising a porous membrane, having pores of from about 10 Angstroms to about 200 Angstroms, said pores containing a facilitator liquid comprising a carrier dissolved in a suitable solvent and functioning as a means for increasing the flux of said at least one component and having an affinity for said at least one component to be selectively separated, said membrane being capable of operating at a transmembrane pressure of about 100 psig to about 1000 psig, and said membrane comprising a polymer, a solvent, an alcohol non-solvent, and a viscosity enhancer and pore former.

7. The membrane of claim 6 wherein said polymer is polysulfone.

8. The membrane of claim 1 wherein said solvent is an amide.

9. The membrane of claim 8 wherein said solvent is N-methylpyrrolidone.

10. The membrane of claim 7 wherein said viscosity enhancer and pore former is polyvinylpyrrolidone.

11. The membrane of claim 7 wherein said alcohol non-solvent is iso-propyl alcohol.

12. A membrane for the selective separation of at least one component of a gaseous feed stream comprising a porous membrane, having pores of from about 10 Angstroms to about 200 Angstroms, said pores containing a facilitator liquid comprising a carrier dissolved in a suitable solvent and functioning as a means for increasing the flux of said at least one component and having an affinity for said at least one component to be selectively separated, said membrane being capable of operating at a transmembrane pressure of about 100 psig to about 1000 psig, and said membrane comprising polysulfone, N-methylpyrrolidone, polyvinylpyrrolidone and iso-propyl alcohol.

* * * * *